United States Patent
Akkarakaran et al.

(10) Patent No.: US 11,937,213 B2
(45) Date of Patent: Mar. 19, 2024

(54) OPTIMIZATIONS FOR SIDELINK USER EQUIPMENT FOR INTEGRATED ACCESS AND BACKHAUL NETWORK

(71) Applicant: QUALCOMM Incorporated, San Diego, CA (US)

(72) Inventors: Sony Akkarakaran, Poway, CA (US); Navid Abedini, Basking Ridge, NJ (US); Naeem Akl, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/385,175

(22) Filed: Jul. 26, 2021

(65) Prior Publication Data
US 2023/0028831 A1   Jan. 26, 2023

(51) Int. Cl.
H04W 72/04   (2023.01)
H04L 1/1812   (2023.01)
H04W 72/02   (2009.01)
H04W 72/0446   (2023.01)

(52) U.S. Cl.
CPC ........... H04W 72/02 (2013.01); H04L 1/1819 (2013.01); H04W 72/0446 (2013.01)

(58) Field of Classification Search
CPC ..... H04W 72/02; H04W 72/04; H04W 72/25; H04W 72/40; H04W 72/0446; H04W 76/14; H04L 1/1819
See application file for complete search history.

(56) References Cited

U.S. PATENT DOCUMENTS 10,701,691 B2 *   6/2020   Li ................... H04W 24/08
2016/0183254 A1 *   6/2016   Jung ................ H04L 67/104
                                                              370/329
2019/0215055 A1 *   7/2019   Majmundar ....... H04W 40/04
(Continued)

FOREIGN PATENT DOCUMENTS

WO   WO-2020146631 A1       7/2020
WO   WO-2021027855 A1 *   2/2021   .............. H04W 4/40

OTHER PUBLICATIONS

NPL R1-1806833 Utilising sidelink in IAB, 3GPP TSG-RAN WG1 Meeting #93, Busan, Korea, May 21-25, 2018 (Year: 2018).*
(Continued)

*Primary Examiner* — Mahbubul Bar Chowdhury
(74) *Attorney, Agent, or Firm* — Holland & Hart LLP

(57) ABSTRACT

Methods, systems, and devices for wireless communications are described. A central unit (CU) function of a base station may identify a first set of user equipment (UE) to communicate via sidelink communications with a distributed unit associated with the central unit. The CU function may determine, based at least in part on the distributed unit being an integrated access and backhaul provider to the first set of UE, a first configuration for the distributed unit to use for sidelink communications with the first set of UE, the first configuration different than a second configuration for one or more nodes associated with the base station to use for sidelink communications with a second set of UE in communication with the base station. The CU function may provide an indication of the first configuration to the distributed unit.

30 Claims, 12 Drawing Sheets

(56) References Cited

U.S. PATENT DOCUMENTS

| | | | |
|---|---|---|---|
| 2020/0374839 A1 | 11/2020 | Novlan et al. | |
| 2020/0413363 A1* | 12/2020 | Park | H04L 1/1896 |
| 2021/0058992 A1* | 2/2021 | Szilágyi | H04W 4/40 |
| 2021/0068181 A1* | 3/2021 | Szilágyi | H04W 72/53 |
| 2022/0369360 A1* | 11/2022 | Zhao | H04W 72/0446 |
| 2023/0039422 A1* | 2/2023 | Wei | H04B 7/15528 |

OTHER PUBLICATIONS

International Search Report and Written Opinion—PCT/US2022/037441—ISA/EPO—dated Nov. 10, 2022 (2101868WO).

* cited by examiner

OPTIMIZATIONS FOR SIDELINK USER EQUIPMENT FOR INTEGRATED ACCESS AND BACKHAUL NETWORK

FIELD OF TECHNOLOGY

The following relates to wireless communications, including optimizations for sidelink user equipment for integrated access and backhaul network.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support optimizations for sidelink user equipment (UE) for integrated access and backhaul (IAB) network. Generally, aspects of the described techniques provide various mechanisms to optimize the configuration used for IAB as well as sidelink communications between UE, a distributed unit (DU) that an IAB node, and the central unit (CU) of a base station that is associated with the IAB node DU. For example, the CU may generally determine or otherwise identify the UE (e.g., a first set of UE) to perform sidelink communications with the DU. The CU may determine or otherwise select a configuration for the DU to use for the sidelink communications with the UE. For example, the configuration may modify feedback delay timelines, channel status reporting timelines, sidelink resource pool configuration, uplink symbol configurations, and the like. Generally, the configuration provides a more appropriate configuration for the DU to use for sidelink communications with the UE (e.g., between the DU and the UEs in the first set of UEs and/or between the UEs in the first set of UEs based on coordination/configuration of the sidelink communications by the DU). The CU may provide the indication of the configuration to the DU, which uses this information to configure and perform the sidelink communications with the UE.

A method for wireless communication at a CU of a base station is described. The method may include identifying a first set of UE to communicate via sidelink communications with a DU associated with the CU, determining, based on the DU being an IAB provider to the first set of UE, a first configuration for the DU to use for sidelink communications with the first set of UE, the first configuration different than a second configuration for one or more nodes associated with the base station to use for sidelink communications with a second set of UE in communication with the base station, and providing an indication of the first configuration to the DU.

An apparatus for wireless communication at a CU of a base station is described. The apparatus may include a processor, memory coupled with the processor, and instructions stored in the memory. The instructions may be executable by the processor to cause the apparatus to identify a first set of UE to communicate via sidelink communications with a DU associated with the CU, determine, based on the DU being an IAB provider to the first set of UE, a first configuration for the DU to use for sidelink communications with the first set of UE, the first configuration different than a second configuration for one or more nodes associated with the base station to use for sidelink communications with a second set of UE in communication with the base station, and provide an indication of the first configuration to the DU.

Another apparatus for wireless communication at a CU of a base station is described. The apparatus may include means for identifying a first set of UE to communicate via sidelink communications with a DU associated with the CU, means for determining, based on the DU being an IAB provider to the first set of UE, a first configuration for the DU to use for sidelink communications with the first set of UE, the first configuration different than a second configuration for one or more nodes associated with the base station to use for sidelink communications with a second set of UE in communication with the base station, and means for providing an indication of the first configuration to the DU.

A non-transitory computer-readable medium storing code for wireless communication at a CU of a base station is described. The code may include instructions executable by a processor to identify a first set of UE to communicate via sidelink communications with a DU associated with the CU, determine, based on the DU being an IAB provider to the first set of UE, a first configuration for the DU to use for sidelink communications with the first set of UE, the first configuration different than a second configuration for one or more nodes associated with the base station to use for sidelink communications with a second set of UE in communication with the base station, and provide an indication of the first configuration to the DU.

Some examples of the method, apparatuses, and non-transitory computer-readable medium described herein may further include operations, features, means, or instructions for identifying an uplink symbol type for each symbol in a set of uplink symbols available for the sidelink communications, where the first configuration includes an uplink symbol configuration that may be based on the uplink symbol type of each symbol in the set of uplink symbols.

In some examples of the method, apparatuses, and non-transitory computer-readable medium described herein, the uplink symbol configuration identifies an allowed uplink symbols of the set of uplink symbols for use in the sidelink communications.

Some examples of the method, apparatuses, and non-transitory computer-readable medium described herein may further include operations, features, means, or instructions for identifying a sidelink resource pool of available resources for use in the sidelink communications, where the first configuration includes a sidelink resource pool configuration that may be based on the sidelink resource pool.

In some examples of the method, apparatuses, and non-transitory computer-readable medium described herein, the sidelink resource pool configuration identifies a set of uplink symbols available for the sidelink communications, each symbol in the set of uplink symbols associated with an uplink symbol type.

In some examples of the method, apparatuses, and non-transitory computer-readable medium described herein, the uplink symbol type of the set of uplink symbols available for sidelink communications includes a subset of uplink symbols including a hard uplink symbol type that may be available for sidelink communications, a soft uplink symbol type that may be available for sidelink communications, or a unavailable uplink symbol type that may be not available for sidelink communications.

In some examples of the method, apparatuses, and non-transitory computer-readable medium described herein, the first set of UE may be not configured with the uplink symbol type of each symbol in the set of uplink symbols.

In some examples of the method, apparatuses, and non-transitory computer-readable medium described herein, the first set of UE may be configured with the uplink symbol type of each symbol in the set of uplink symbols.

Some examples of the method, apparatuses, and non-transitory computer-readable medium described herein may further include operations, features, means, or instructions for identifying a set of timing delays associated with the sidelink communications, where the first configuration includes a timing delay configuration that may be based on the set of timing delays.

In some examples of the method, apparatuses, and non-transitory computer-readable medium described herein, the set of timing delays include a hybrid automatic repeat/request timing delay, a channel state information timing delay, or a combination thereof.

A method for wireless communication at a DU of a base station is described. The method may include receiving, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station and performing the sidelink communications with the first set of UE according to the first configuration.

An apparatus for wireless communication at a DU of a base station is described. The apparatus may include a processor, memory coupled with the processor, and instructions stored in the memory. The instructions may be executable by the processor to cause the apparatus to receive, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station and perform the sidelink communications with the first set of UE according to the first configuration.

Another apparatus for wireless communication at a DU of a base station is described. The apparatus may include means for receiving, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station and means for performing the sidelink communications with the first set of UE according to the first configuration.

A non-transitory computer-readable medium storing code for wireless communication at a DU of a base station is described. The code may include instructions executable by a processor to receive, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station and perform the sidelink communications with the first set of UE according to the first configuration.

Some examples of the method, apparatuses, and non-transitory computer-readable medium described herein may further include operations, features, means, or instructions for identifying an uplink symbol type for each symbol in a set of uplink symbols available for the sidelink communications, where the first configuration includes an uplink symbol configuration that may be based on the uplink symbol type of each symbol in the set of uplink symbols.

In some examples of the method, apparatuses, and non-transitory computer-readable medium described herein, the uplink symbol configuration identifies an allowed uplink symbols of the set of uplink symbols for use in the sidelink communications.

Some examples of the method, apparatuses, and non-transitory computer-readable medium described herein may further include operations, features, means, or instructions for identifying a sidelink resource pool of available resources for use in the sidelink communications, where the first configuration includes a sidelink resource pool configuration that may be based on the sidelink resource pool.

In some examples of the method, apparatuses, and non-transitory computer-readable medium described herein, the sidelink resource pool configuration identifies a set of uplink symbols available for the sidelink communications, each symbol in the set of uplink symbols associated with an uplink symbol type.

In some examples of the method, apparatuses, and non-transitory computer-readable medium described herein, the uplink symbol type of the set of uplink symbols available for sidelink communications includes a subset of uplink symbols including a hard uplink symbol type that may be available for sidelink communications, a soft uplink symbol type that may be available for sidelink communications, or a unavailable uplink symbol type that may be not available for sidelink communications.

In some examples of the method, apparatuses, and non-transitory computer-readable medium described herein, the first set of UE may be not configured with the uplink symbol type of each symbol in the set of uplink symbols.

In some examples of the method, apparatuses, and non-transitory computer-readable medium described herein, the first set of UE may be configured with the uplink symbol type of each symbol in the set of uplink symbols.

Some examples of the method, apparatuses, and non-transitory computer-readable medium described herein may further include operations, features, means, or instructions for identifying a set of timing delays associated with the sidelink communications, where the first configuration includes a timing delay configuration that may be based on the set of timing delays.

In some examples of the method, apparatuses, and non-transitory computer-readable medium described herein, the set of timing delays include a hybrid automatic repeat/request timing delay, a channel state information timing delay, or a combination thereof.

DETAILED DESCRIPTION

Some wireless communications systems may support an integrated access and backhaul (IAB) network. Generally, the IAB network may support Uu interface-based communications between one or more distributed units (DUs) of the IAB network and user equipment (UE). Generally, the IAB network is transparent to the UE being served by the IAB nodes within the IAB network. Wireless communications systems may also support sidelink communications between UE (e.g., UE-to-UE or inter-UE communications using a PC5 interface). The sidelink communications may operate according to a mode 1 where the BS (or DU in a central unit (CU)/DU split configuration) manages aspects of the sidelink communications. However, an IAB node (e.g., the DU function of the IAB node) may have difficulty managing IAB communications as well as the sidelink communications between the UE. That is, the processing requirement and other oversight/management functions required by a DU function of an IAB node to manage both the Uu interface communications via the IAB network, sidelink communications between various UE, and/or Uu interface-based communications between an mobile terminal (MT) function of the IAB node may simply be too much for the IAB node to handle, at least in a manner that satisfies various latency/reliability requirements.

Aspects of the disclosure are initially described in the context of wireless communications systems. Generally, aspects of the described techniques provide various mechanisms to optimize the configuration used for IAB as well as sidelink communications between UE, a DU that an IAB node, and the CU of a base station that is associated with the IAB node DU. For example, the CU may generally determine or otherwise identify the UE (e.g., a first set of UE) to perform sidelink communications with the DU. The CU may determine or otherwise select a configuration for the DU to use for the sidelink communications with the UE. For example, the configuration may modify feedback delay timelines, channel status reporting timelines, sidelink resource pool configuration, uplink symbol configurations, and the like. Generally, the configuration provides a more appropriate configuration for the DU to use for sidelink communications with the UE (e.g., between the DU and the UEs in the first set of UEs and/or between the UEs in the first set of UEs based on coordination/configuration of the sidelink communications by the DU). The CU may provide the indication of the configuration to the DU, which uses this information to configure and perform the sidelink communications with the UE.

Aspects of the disclosure are further illustrated by and described with reference to apparatus diagrams, system diagrams, and flowcharts that relate to optimizations for sidelink UE for IAB network.

Figure 1:
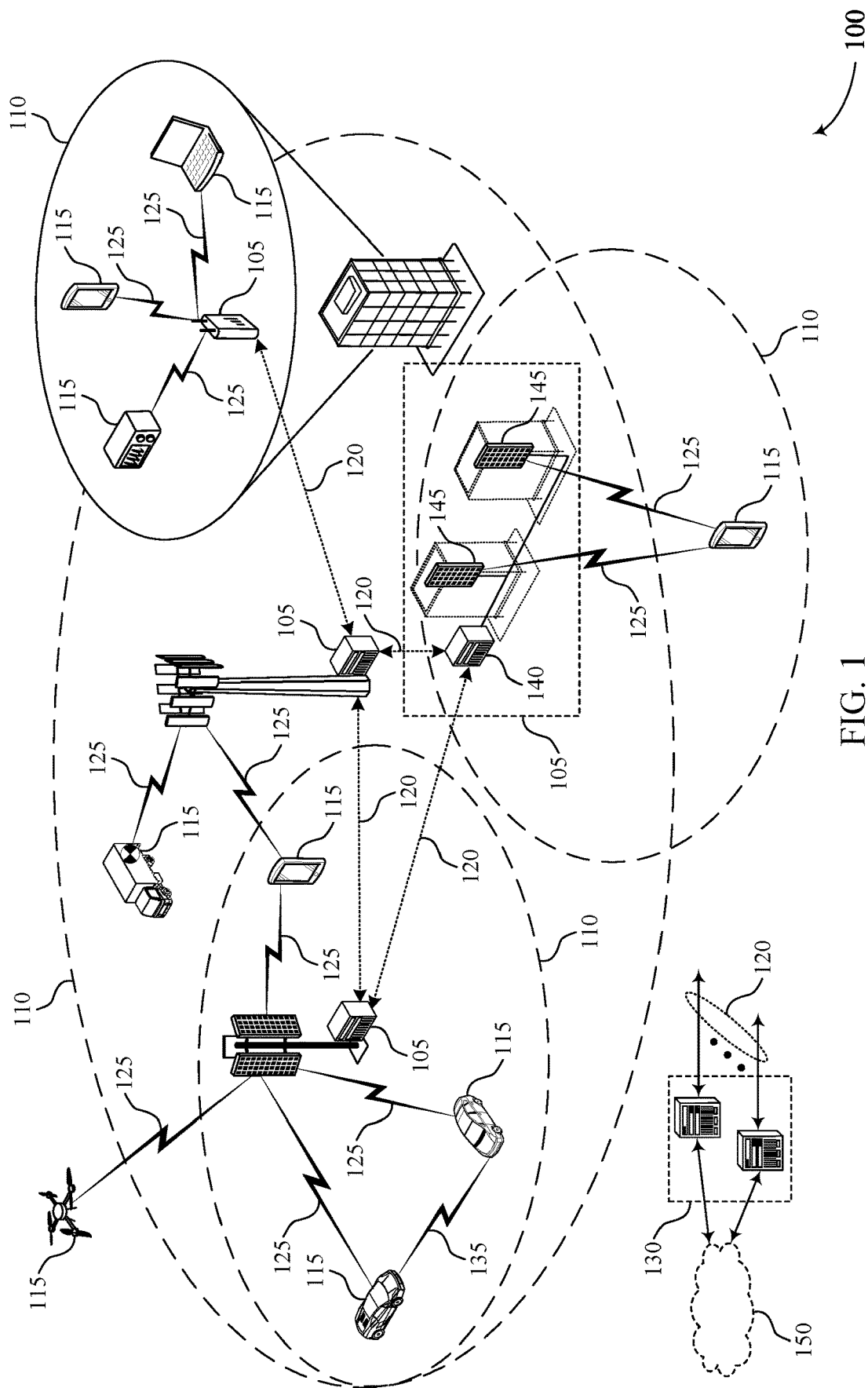
FIG. 1 illustrates an example of a wireless communications system that supports optimizations for sidelink user equipment (UE) for integrated access and backhaul (IAB) network in accordance with aspects of the present disclosure.

FIG. 1 illustrates an example of a wireless communications system 100 that supports optimizations for sidelink UE for IAB network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 (e.g., a CU function of, or otherwise associated with, the base station 105) may identify a first set of UE to communicate via sidelink communications with a DU associated with the CU. The base station 105 may determine, based at least in part on the DU being an IAB provider to the first set of UE, a first configuration for the DU to use for sidelink communications with the first set of UE, the first configuration different than a second configuration for one or more nodes associated with the base station 105 to use for sidelink communications with a second set of UE in communication with the base station 105. The base station 105 may provide an indication of the first configuration to the DU.

A base station 105 (e.g., a DU function of, or otherwise associated with, the base station 105) may receive, based at least in part on the DU being an IAB provider to a first set of UE, an indication of a first configuration for the DU to use for sidelink communications with the first set of UE, the first configuration different than a second configuration for one or more nodes associated with the base station 105 to use for sidelink communications with a second set of UE in communication with the base station 105. The base station 105 may perform the sidelink communications with the first set of UE according to the first configuration.

Figure 2:
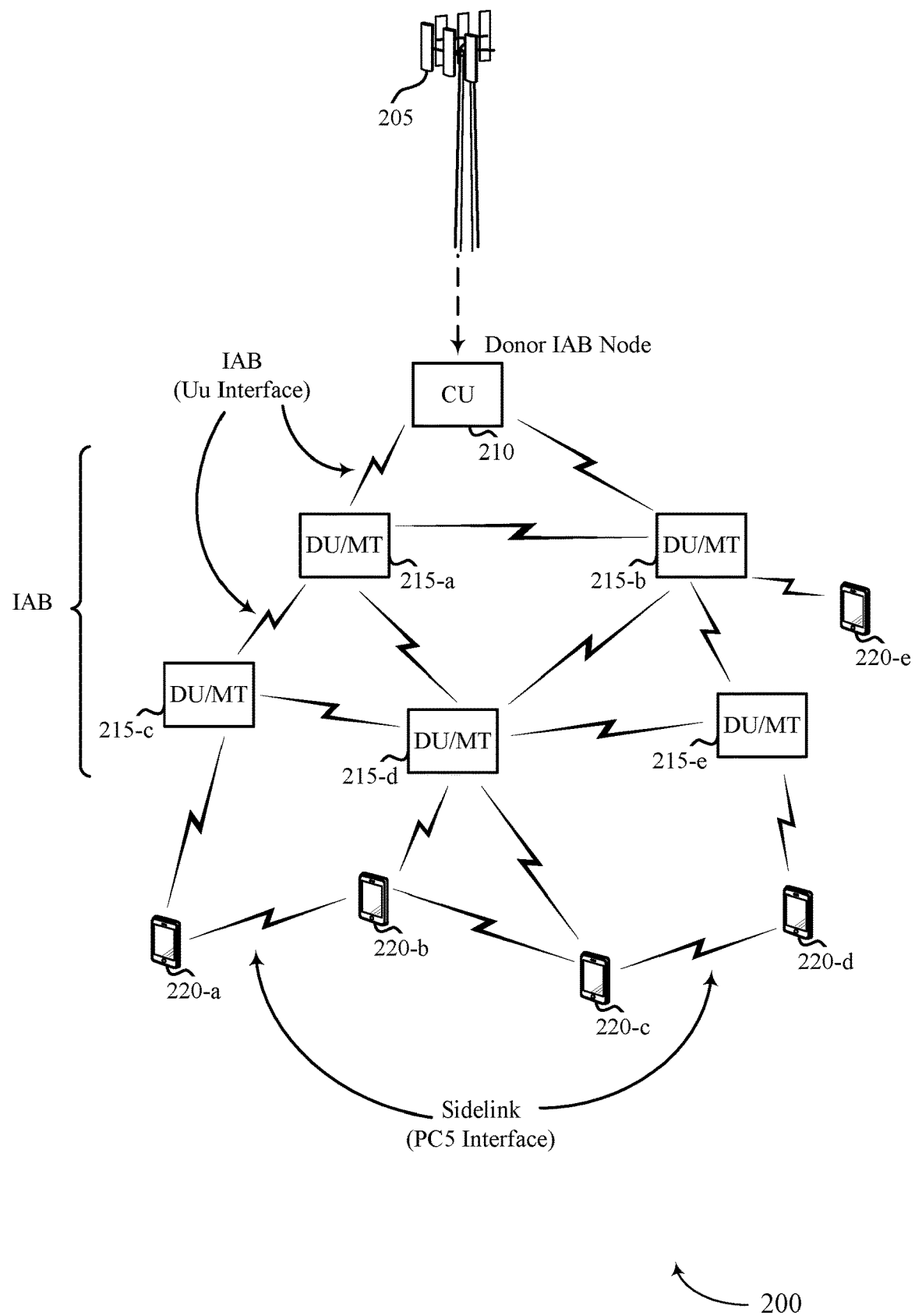
FIG. 2 illustrates an example of a wireless communications system that supports optimizations for sidelink user equipment for IAB network in accordance with aspects of the present disclosure.

FIG. 2 illustrates an example of a wireless communications system 200 that supports optimizations for sidelink UE for IAB networks in accordance with aspects of the present disclosure. Wireless communications system 200 may implement aspects of wireless communications system 100. Wireless communications system 200 may include base station 205 and one or more UEs 220, which may be examples of the corresponding devices described herein. Base station 205 may include a CU 210 and/or one or more DU 215, which may be examples of the corresponding devices described herein. For example, CU 210 and/or DU 215 may be functions/components implemented at, implemented by, or otherwise associated with base station 205.

In some aspects, wireless communications system 200 may illustrate a non-limiting example of a CU/DU split architecture. CU 210 may manage aspects of one or more DU(s) 215, with five DUs 215 being shown by way of example only. DU 215 generally implements the L1 functionality of the RAN, e.g., where the radio frequency signals are transmitted/received, amplified, digitized, etc. Typically within the DU/CU split architecture, the CU 210 would be connected to each DU 215 via a wired connection utilizing an F1 interface. In such a typical deployment, the DU 215 may implement aspects of the layer one (possibly some layer two) functionality for wireless communications between base station 205 and UE 220, with CU 210 managing at least a portion of the higher layer (e.g., layer two and/or layer three) functionality for such communications. That is, each DU 215 may perform wireless communications with individual UE 220 (e.g., DU 215-b and UE 220-e), which then passes the information/data to base station 205 via CU 210.

However, in some deployment scenarios the CU/DU split architecture may also be implemented within, or otherwise implement, an IAB network. For example, each DU 215 may be remote from CU 210 and may communicate with CU 210 wirelessly using a Uu interface. For example, CU 210 may communicate wirelessly with DU 215-a and with DU 215-b. DU 215-a may communicate wirelessly with DU 215-c and 215-d, which may also communicate with each other wirelessly using the Uu interface. DU 215-b may communicate wirelessly with DU 215-d and 215-e, which may also communicate with each other wirelessly using the Uu interface.

In such a CU/DU split/IAB deployment scenario, each DU 215 may also be equipped with, or otherwise support, a mobile terminal (MT) function. The MT function may manage aspects of wireless communications between DU 215 and individual UE 220. For example, the MT function of DU 215-c may communicate wirelessly using a Uu interface with UE 220-a, the MT function of DU 215-d may communicate wirelessly using the Uu interface with UE 220-b and with UE 220-c, the MT function of DU 215-e may communicate wirelessly using the Uu interface with UE 220-d, and the MT function of DU 215-b may communicate wirelessly using the Uu interface with UE 220-e. The DU function in this context may manage aspects of the wireless backhaul interface (e.g., the IAB network communications), as discussed above (e.g., wirelessly using the Uu function).

In some example, the UE 220 being served by a DU 215 may also be performing sidelink communications (e.g., UE-to-UE or inter-UE communications) via a PC5 interface. For example, UE 220-a may be communicating wirelessly using the PC5 interface, UE 220-b may be communicating wirelessly using the PC5 interface with UE 220-c, and UE 220-c may be communicating wirelessly using the PC5 interface with UE 220-d.

In this CU/DU split/IAB network scenario, the DU function of DU 215 (and/or a sidelink function of DU 215) may manage aspects of such sidelink communications between the sidelink UE. For example, the DU function of DU 215 may manage, schedule, or otherwise control aspects of the sidelink communications wireless using the PC5 interface and/or a Uu interface between the DU 215 and UE 220.

In some examples, the wireless IAB (e.g., the Uu interface based IAB) may provide a backhaul relay scheme, which may target a particular frequency range (FR), e.g., FR1, FR2, etc. The IAB network aspects are generally transparent to the UE 220. However, the current design of such a CU/DU split/IAB network deployment scenario may result in the DU 215 (e.g., the DU function and/or a sidelink function within DU 215) managing wireless IAB communication via a Uu interface with other DU 215 and/or CU 210, managing wireless communications between the MT function of DU 215 and UE 220, as well as managing wireless communications using the PC5 interface between UE 220. For example, as compared to regular (e.g., wired) non-IAB DUs, the IAB DUs may have difficulty managing the sidelink UEs (e.g., due to the complexities in the IAB node (e.g., CU 210 and/or DU 215) managing both the IAB-DU+child links and the IAB-MT+parent links. This may create numerous problems, in some examples, such that wireless communications system 200 may benefit from optimizations for the sidelink UE and IAB network.

Accordingly, aspects of the described techniques may provide various optimizations that may be adopted by wireless communications system 200 to improve all wireless communications. Broadly, such techniques may a different configuration (which may be referred to as a first configuration for simplicity) being provide to DU 215 to improve sidelink communications between UE 220. In some aspects, the sidelink configuration (e.g., the first configuration) of UEs 220 connected to an IAB-DU (e.g., the DU and/or sidelink function of DU 215) may allow a more relaxed processing by the DU 215. Generally, the sidelink configuration (e.g., the first configuration) may be based on the configuration of the serving DU. Although aspects of these techniques are generally described with reference to the DU 215 managing sidelink communications between UE 220, it is to be understood that such techniques may also be implemented to manage wireless communications between the DU function of DU 215 and UEs 220.

Broadly, the described techniques may include CU 210 using RRC messages to configure the sidelink configuration (e.g., the first configuration) of a UE 220 based on the configuration of the DU 215 in whose coverage area the UE 220 is located. For example, CU 210 may identify or otherwise determine a first set of UE 220 to communicate via sidelink communications with a DU 215 associated with CU 210. For example, CU 210 may receive various signaling, reports, etc., from DU 215 explicitly and/or implicitly indicating which UE 220 are located within the coverage of the DU 215 and/or that such UE 220 are performing sidelink communications. Accordingly, CU 210 may identify or otherwise determine that the first set of UE 220 for DU 215-c includes UE 220-a, the first set of UE 220 for DU 215-d includes UE 220-b and UE 220-c, and the first set of UE 220 for DU 215-e includes UE 220-d.

Based on the DU 215 being an IAB node serving the UE 220, CU 210 may determine the sidelink configuration (e.g., the first configuration) for the DU 215 to use for sidelink communications with the first set of UE 220 (e.g., between the DU and the UEs in the first set of UEs and/or between the UEs in the first set of UEs based on coordination/configuration of the sidelink communications by the DU). Broadly, the sidelink configuration (e.g., the first configuration) may be different than other configurations (e.g., a second configuration) use for other nodes (e.g., IAB nodes) associated with base station 205 to use for sidelink communications with a second set of UE 220 (e.g., such as a configuration for DU 215-b to use for communications with UE 220-e). CU 210 may transmit or otherwise provide an indication of the sidelink configuration to the DU 215 (e.g., directly to the DU 215 or via one or more hops from a parent DU, such as from DU 215-a to DU 215-d).

As discussed above, in some examples the sidelink configuration may provide a more relaxed processing requirements for the DU 215. One example of this may include the sidelink configuration allowing additional delays for certain processes. For example, CU 210 may select, identify, or otherwise determine a set of timing delays associated with the sidelink communications. The sidelink configuration (e.g., the first configuration), in this context, may correspond to a timing delay configuration based on the timing delays. For example, CU 210 may configure DU 215 to allow more delays in HARQ, CSI measurement and/or reporting, and the like, for the sidelink communications. The additional delays may ease the processing burden/timeline of DU 215 managing aspects of sidelink communications with the UE 220. In some examples, this may include the timing delay configuration including or otherwise indicating an allowed set of delays that are increased for an IAB-DU (such as a DU 215 that is also part of a wireless IAB network). Such increased timing delays may be pre-configured (e.g., adopted across all wireless communications system 200) and/or may be chosen by implementation (e.g., by the network, base station 205, and/or CU 210).

Non-limiting examples of HARQ timing delays that may be extended include, but are not limited to, a timing delay between a DCI grant (e.g., DCI format 3_0) and the sidelink control information (SCI) resource, between the SCI resource and the PSSCH resources, between the PSSCH resources and the physical sidelink feedback channel (PSFCH) HARQ-ACK feedback for the PSSCH, between the PSFCH HARQ-ACK and a relayed uplink HARQ-ACK, and the like. Non-limiting examples of the CSI timing delays that may be extended include, but are not limited to, delays between a CSI-RS trigger and transmission of the CSI-RS, between the CSI-RS transmission and the CSI report based on the CSI transmission, between reporting the received sidelink CSI to the base station 205, and the like.

In some examples, DU 215 may transmit or otherwise provide a request to base station 205 (e.g., via CU 210) for the increased delay times, The sidelink configuration including the timing delay configuration may be in response to the request.

In another example, the sidelink configuration may be based on an uplink symbol type. For example, a sidelink resource pool may include only uplink symbols being available for the UE 220 to use for sidelink communications. However, in an IAB network scenario, the uplink symbols may have an associated uplink symbol type. The uplink symbol type may include a hard (H) uplink symbol where the uplink symbol is available for sidelink communications, a soft (S) uplink symbol type where the uplink symbol may or may not be available for sidelink communications, or an unavailable (NA) uplink symbol type where the uplink symbol is not available for sidelink communications.

Accordingly, CU 210 may configure, allocate, identify, or otherwise determine the sidelink resource pool of available resources (e.g., using the parameter SL resourcepool) for use in sidelink communications. In this context, the sidelink configuration may include a sidelink resource pool configuration that is based, at least to some degree, on the sidelink resource pool. In some aspects, the sidelink resource pool may be dynamically updated, which may also update the sidelink resource pool configuration. The sidelink resource pool configuration may identify the set of uplink symbols available for sidelink communications. For example, the sidelink resource pool configuration may identify all uplink symbol, only hard and soft uplink symbol types, or only hard uplink symbol types. The DU 215 may (e.g., based on the sidelink resource pool configuration) choose whether to only configure the hard uplink symbol types for sidelink communications or to also allow certain (e.g., some, but possibly not all) soft uplink symbol types to be use for sidelink communications. In this context, the DU 215 may not inform the UE 220 in the first set of UE with the uplink symbol type of each symbol in the set of uplink symbols. That is, the DU 215 may simply identify which symbols are available for use in sidelink communications to the UE 220, but may not indicate what the uplink symbol types are. In another example, the DU 215 may indicate the H/NA/S symbol types to UE 220, and then each UE 220 may treat only the H uplink symbol types as being available for sidelink communications. While this may be supported for UE 220, in other examples this may be use for UEs that are actually MT functions (e.g., essentially UE functions) within other IAB nodes (e.g., other DU 215) that are supporting sidelink functionality. Accordingly, in some examples the DU 215 may configure the UE 220 with the uplink symbol type of each symbol in the set of uplink symbols.

The DU 215 may receive the indication of the sidelink configuration (e.g., the first configuration) and use the configuration to manage aspects of the sidelink communications between the UE 220. For example, DU 215 may adopt a more relaxed timeline for HARQ-ACK feedback, CSI operations, and the like, for the sidelink communications and/or for the access link (e.g., the Uu interface) communications. In another example, DU 215 may utilize the uplink symbol type for uplink symbols within the sidelink resource pool to manage aspects of the sidelink communications, e.g., either selecting and indicating to the UE 220 which uplink symbols can be used for sidelink communications or indicating the uplink symbol types to the UE 220, which uses the hard uplink symbol types for the sidelink communications.

Figure 3:
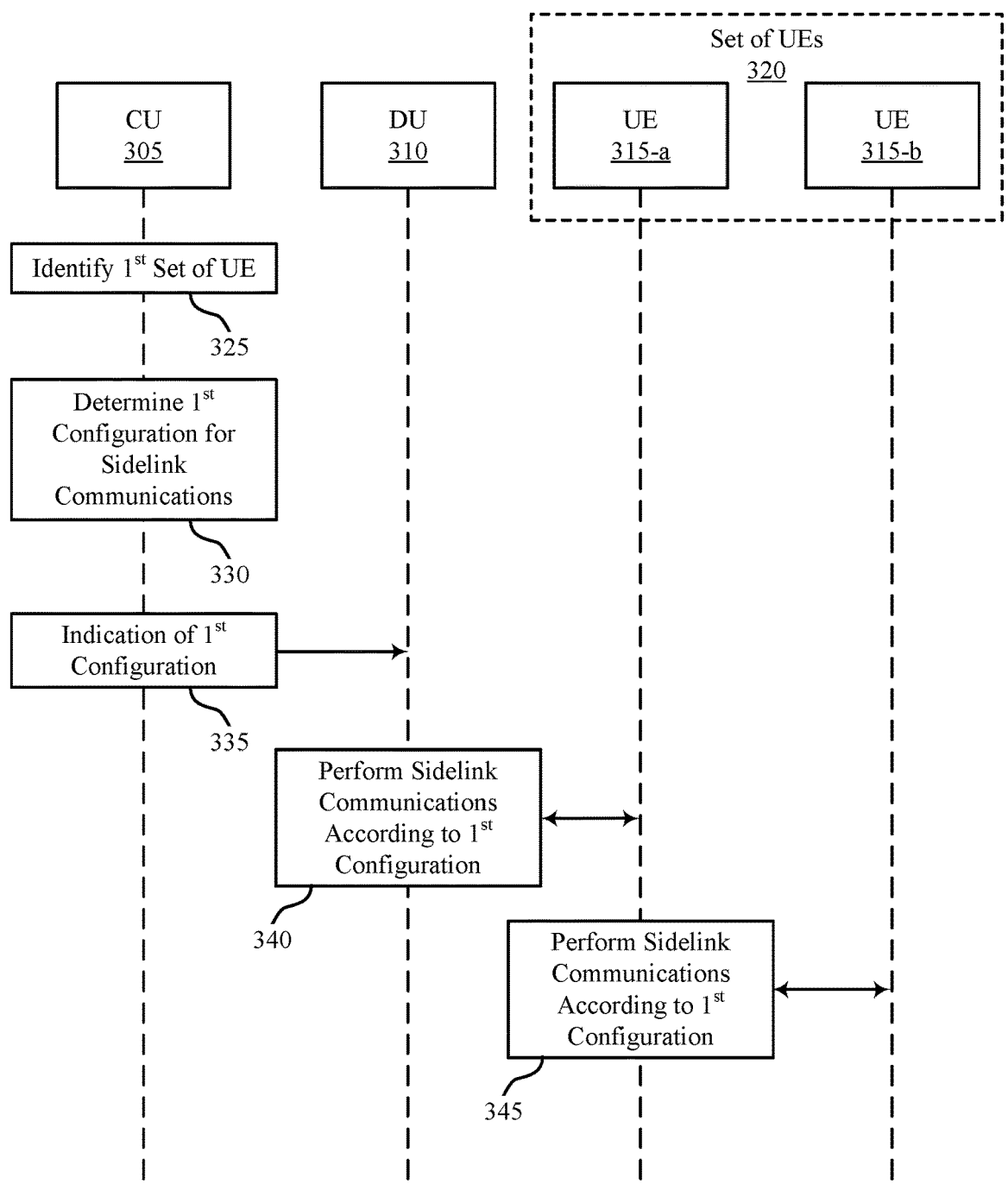
FIG. 3 illustrates an example of a process that supports optimizations for sidelink UE for IAB network in accordance with aspects of the present disclosure.

FIG. 3 illustrates an example of a process 300 that supports optimizations for sidelink UE for IAB network in accordance with aspects of the present disclosure. Process 300 may implement aspects of wireless communications systems 100 and/or 200. Aspects of process 300 may be implemented at or implemented by CU 305, DU 310, and/or a first set of UEs 320 (which includes UE 315-a and UE 315-b by way of non-limiting example), which may be examples of the corresponding devices described herein. In some aspects, CU 305 and DU 310 may be associated with a base station. In some aspects, DU 310 may be an IAB node performing sidelink communications with the first set of UEs 320.

At 325, CU 305 may identify or otherwise determine a first set of UE 320 to communicate with DU 310 via sidelink communications. For example, CU 305 may monitor communications associated with DU 310 and/or receive one or more messages carrying or otherwise conveying an indication of which UEs are performing sidelink communications with DU 310. In the non-limiting example illustrated in process 300, the first set of UEs 320 may include UE 315-a and UE 315-b, although more than two UE may be included in the first set of UEs 320.

At 330, CU 305 may identify or otherwise determine a first configuration (e.g., a sidelink configuration) for DU 310 to use for the sidelink communications with the first set of UEs 320 (e.g., with UE 315-a and 315-b). That is, the sidelink communications may be between DU 310 and UE 315-a (as well as other UEs in the first set of UEs 320) and/or between the UEs within the first set of UEs 320 (e.g., between UE 315-a and UE 315-b in the first set of UEs 320). For example, in some examples DU 310 may be configured with a sidelink communication function (e.g., supporting the PC5 sidelink interface) that can be used for sidelink communications between DU 310 and the UEs 315 within the first set of UEs 320. Additionally, DU 310 may also use a Uu interface to coordinate aspects of the sidelink communications for the first set of UEs 320. More particularly, DU 310 may use the Uu interface to configure the first set of UEs 320 with the first configuration (e.g., the sidelink configuration, which may include grants, configuration parameters, etc.), which the UEs 315 may then use to perform inter-UE sidelink communications. The configuration messages may be constructed at the CU 305, in some examples with input from the DU 310, and may be sent from the CU 305 to the UE via the DU 310.

In some aspects, the first configuration may be based on the fact that DU 310 is an IAB node, or otherwise provides IAB service to UE 315. The first configuration may be based on the fact that DU 310 is performing the sidelink communications with UE 315. That is, the first configuration may be different than a second configuration for other nodes associated with the base station to use for their sidelink communications with a second set of UE (e.g., with other UE). CU 305 may generally optimize the parameters/values in the first configuration based on DU 310 being an IAB node and also performing sidelink communications with UE 315 and/or for configuring the UEs 315 in the first set of UEs 320 for sidelink communications between the UEs 315 in the first set of UEs 320.

In some aspects, this may include CU 305 identifying an uplink symbol type (e.g., based on a sidelink resource pool available for such sidelink communications) for each symbol in a set of uplink symbols that are available or could otherwise be used for the sidelink communications. In this context, the first configuration (e.g., the sidelink configuration) may be an uplink symbol configuration that is based, at least to some degree, on the uplink symbol type of each symbol in the set of uplink symbols. For example, the uplink symbol configuration may indicate or otherwise identify the allowed uplink symbols in the set of symbols that can be used for the sidelink communications (e.g., symbols having a hard (H) uplink symbol type, and possibly some symbols having a soft (S) uplink symbol type).

In some aspects, this may include CU 305 identifying or otherwise determining a sidelink resource pool of available resources for use in the sidelink communications. In this context, the first configuration (e.g., the sidelink configuration) may be a sidelink resource pool configuration based on the available resources in the sidelink resource pool. As discussed above, the sidelink resource pool configuration may identify a set of uplink symbols that are available for the sidelink communications. For example, the sidelink resource pool configuration may identify a hard (H) uplink symbol type associated with symbols that are available for sidelink communications, a soft (S) uplink symbol type associated with symbols that may be available for sidelink communications, and/or an unavailable (NA) uplink symbol type associated with symbols that are not available for sidelink communications.

In some aspects, this may include CU 305 identifying or otherwise determining a set of timing delays associated with the sidelink communications. In this context, the first configuration (e.g., the sidelink configuration) may be a timing delay configuration based on the set of timing delays. For example, the timing delay configuration may identify timing delay values that are more suited to DU 310 providing IAB services to UE 315 as an IAB node as well as performing the sidelink communications with UE 315. Examples of the timing delays include, but are not limited to, HARQ-ack timing delays, CSI timing delays, and the like.

Accordingly and at 335, CU 305 may transmit or otherwise provide (and DU 310 may receive or otherwise obtain) an indication of the first configuration. For example, CU 305 may transmit the indication of the first configuration to DU 310 wirelessly over a Uu interface of the IAB network.

Based on the first configuration, DU 310 may identify or otherwise determine the sidelink resource pool configuration, the uplink symbol configuration, the timing delay configuration, and the like, for the sidelink communications with UE 315. In the example where the first configuration is based on the uplink symbol types, DU 310 may either inform or not inform UE 315 of the uplink symbol types. For example, DU 310 may simply manage the uplink symbol types and choose hard uplink symbol types and/or soft uplink symbol types to schedule sidelink communications with UE 315. In another example, DU 310 may transmit or otherwise provide an indication of the available uplink symbol types to UE 315, and UE 315 may then select which uplink symbols are available for sidelink communications based on the symbol type of each uplink symbol.

Accordingly and at 340, DU 310 may perform sidelink communications with UE 315-*a* (for example) according to the first configuration. For example, such sidelink communications may be performed during certain uplink symbol types, may utilize various timing delays, and the like. This may provide a mechanism for CU 305 to provide the first configuration to DU 310, which may improve operations of DU 310 when acting as an IAB node and performing sidelink communications with UE 315.

At 345, UE 315-*a* may perform sidelink communications with UE 315-*b* according to the first configuration. For example, such sidelink communications may be performed during certain uplink symbol types, may utilize various timing delays, and the like.

Figure 4:
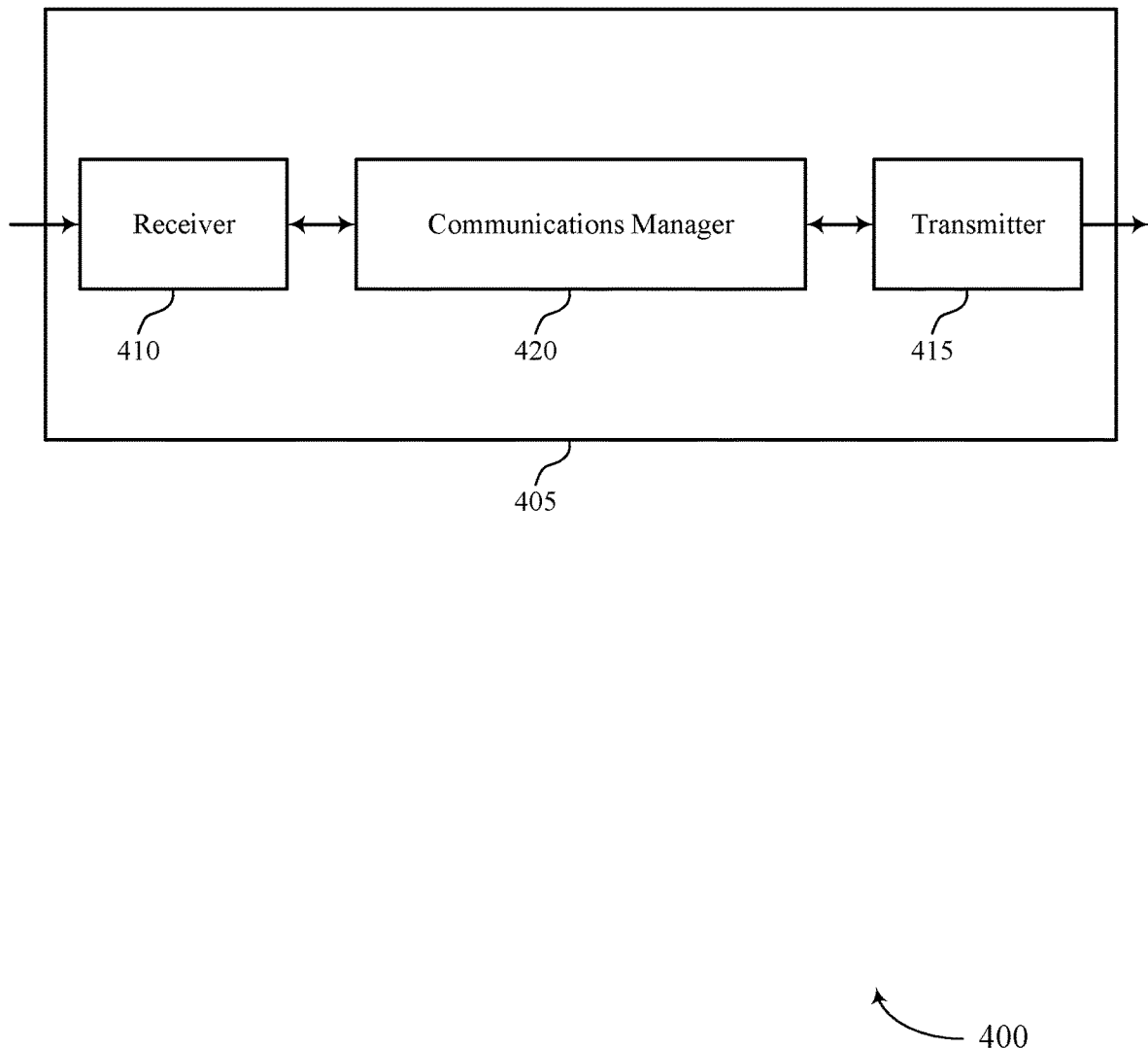
FIGS. 4 and 5 show block diagrams of devices that support optimizations for sidelink UE for IAB network in accordance with aspects of the present disclosure.

FIG. 4 shows a block diagram 400 of a device 405 that supports optimizations for sidelink UE for IAB network in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to optimizations for sidelink UE for IAB network). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to optimizations for sidelink UE for IAB network). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of optimizations for sidelink UE for IAB network as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a CU of a base station in accordance with examples as disclosed herein. For example, the communications manager 420 may be configured as or otherwise support a means for identifying a first set of UE to communicate via sidelink communications with a DU associated with the CU. The communications manager 420 may be configured as or otherwise support a means for determining, based on the DU being an IAB provider to the first set of UE, a first configuration for the DU to use for sidelink communications with the first set of UE, the first configuration different than a second configuration for one or more nodes associated with the base station to use for sidelink communications with a second set of UE in communication with the base station. The communications manager 420 may be configured as or otherwise support a means for providing an indication of the first configuration to the DU.

Additionally, or alternatively, the communications manager 420 may support wireless communication at a DU of a base station in accordance with examples as disclosed herein. For example, the communications manager 420 may be configured as or otherwise support a means for receiving, based on the DU being an IAB provider to a first set of UE, an indication of a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The communications manager 420 may be configured as or otherwise support a means for performing the sidelink communications with the first set of UE according to the first configuration.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for a CU function of a base station to more intelligently configure a DU function acting as an IAB node and performing sidelink communications with UE.

Figure 5:
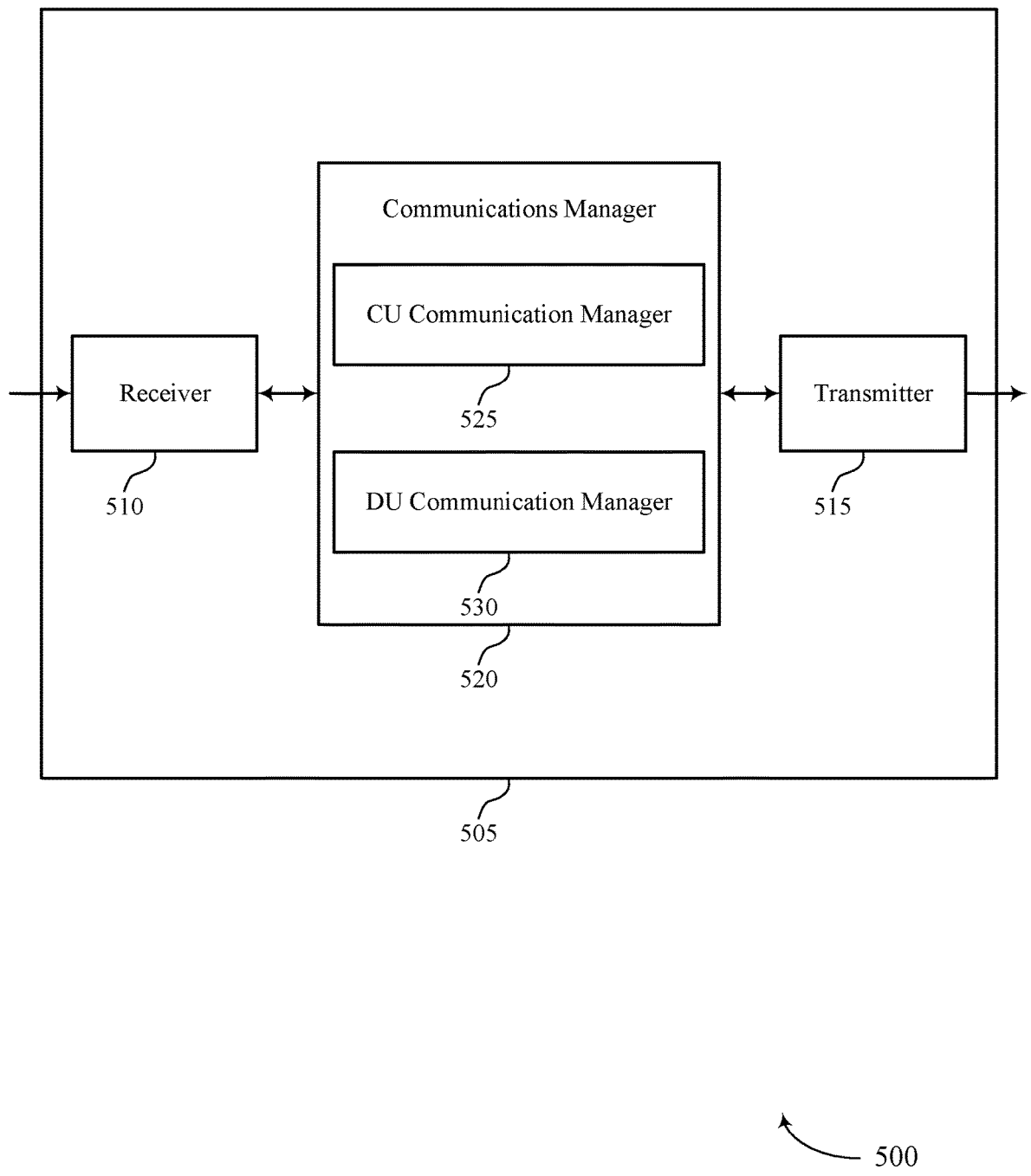

FIG. 5 shows a block diagram 500 of a device 505 that supports optimizations for sidelink UE for IAB network in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to optimizations for sidelink UE for IAB network). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to optimizations for sidelink UE for IAB network). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of optimizations for sidelink UE for IAB network as described herein. For example, the communications manager 520 may include a CU communication manager 525 a DU communication manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a CU of a base station in accordance with examples as disclosed herein. The CU communication manager 525 may be configured as or otherwise support a means for identifying a first set of UE to communicate via sidelink communications with a DU associated with the CU. The CU communication manager 525 may be configured as or otherwise support a means for determining, based on the DU being an IAB provider to the first set of UE, a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The CU communication manager 525 may be configured as or otherwise support a means for providing an indication of the first configuration to the DU.

Additionally, or alternatively, the communications manager 520 may support wireless communication at a DU of a base station in accordance with examples as disclosed herein. The DU communication manager 530 may be configured as or otherwise support a means for receiving, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station. The DU communication manager 530 may be configured as or otherwise support a means for performing the sidelink communications with the first set of UE according to the first configuration.

Figure 6:
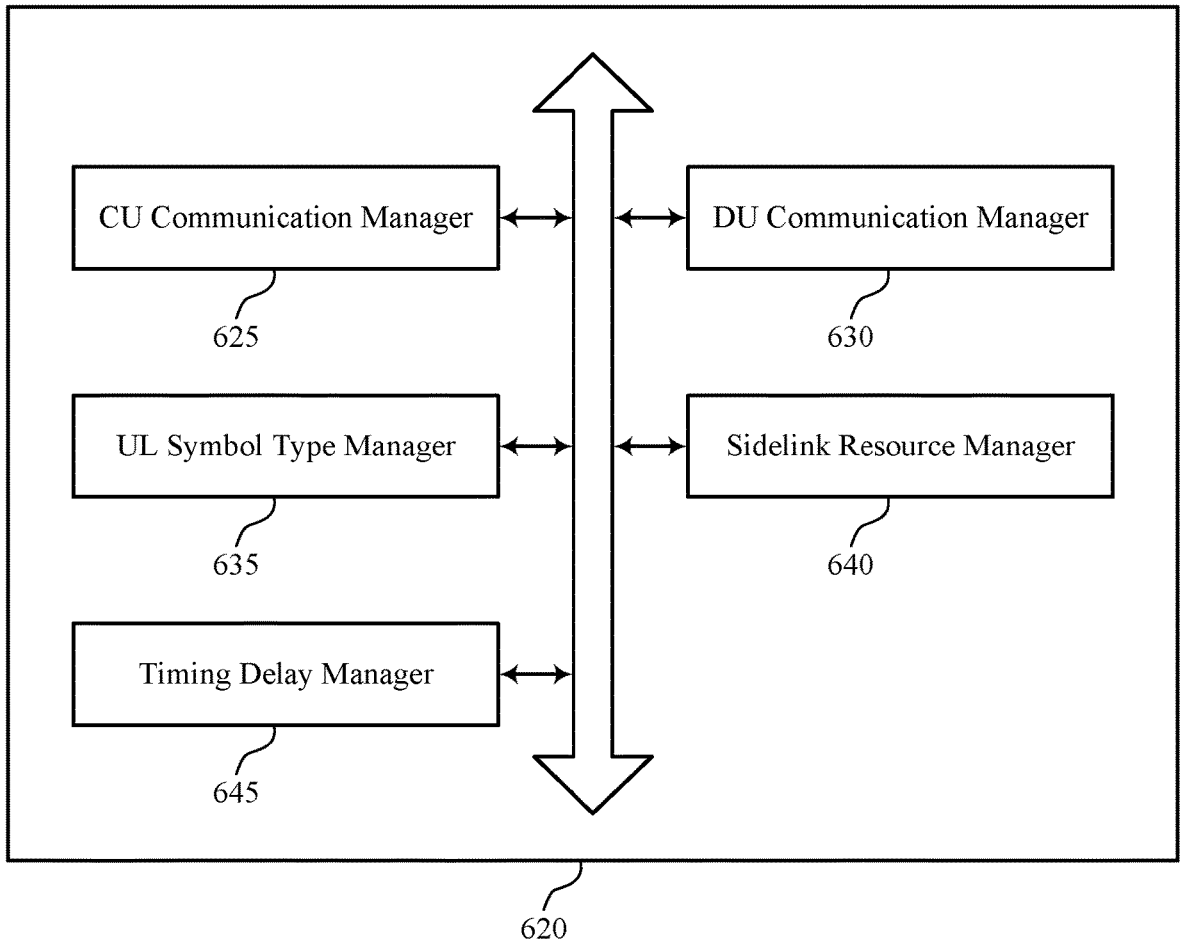
FIG. 6 shows a block diagram of a communications manager that supports optimizations for sidelink UE for IAB network in accordance with aspects of the present disclosure.

FIG. 6 shows a block diagram 600 of a communications manager 620 that supports optimizations for sidelink UE for IAB network in accordance with aspects of the present disclosure. The communications manager 620 may be an example of aspects of a communications manager 420, a communications manager 520, or both, as described herein. The communications manager 620, or various components thereof, may be an example of means for performing various aspects of optimizations for sidelink UE for IAB network as described herein. For example, the communications manager 620 may include a CU communication manager 625, a DU communication manager 630, a UL symbol type manager 635, a sidelink resource manager 640, a timing delay manager 645, or any combination thereof. Each of these components may communicate, directly or indirectly, with one another (e.g., via one or more buses).

The communications manager 620 may support wireless communication at a CU of a base station in accordance with examples as disclosed herein. The CU communication manager 625 may be configured as or otherwise support a means for identifying a first set of UE to communicate via sidelink communications with a DU associated with the CU. In some examples, the CU communication manager 625 may be configured as or otherwise support a means for determining, based on the DU being an IAB provider to the first set of UE, a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. In some examples, the CU communication manager 625 may be configured as or otherwise support a means for providing an indication of the first configuration to the DU.

In some examples, the UL symbol type manager 635 may be configured as or otherwise support a means for identifying an uplink symbol type for each symbol in a set of uplink symbols available for the sidelink communications, where the first configuration includes an uplink symbol configuration that is based on the uplink symbol type of each symbol in the set of uplink symbols. In some examples, the uplink symbol configuration identifies an allowed uplink symbols of the set of uplink symbols for use in the sidelink communications.

In some examples, the sidelink resource manager 640 may be configured as or otherwise support a means for identifying a sidelink resource pool of available resources for use in the sidelink communications, where the first configuration includes a sidelink resource pool configuration that is based on the sidelink resource pool. In some examples, the sidelink resource pool configuration identifies a set of uplink symbols available for the sidelink communications, each symbol in the set of uplink symbols associated with an uplink symbol type. In some examples, the uplink symbol type of the set of uplink symbols available for sidelink communications includes a subset of uplink symbols including a hard uplink symbol type that is available for sidelink communications, a soft uplink symbol type that may be available for sidelink communications, or a unavailable uplink symbol type that is not available for sidelink communications.

In some examples, the first set of UE are not configured with the uplink symbol type of each symbol in the set of uplink symbols. In some examples, the first set of UE are configured with the uplink symbol type of each symbol in the set of uplink symbols.

In some examples, the timing delay manager 645 may be configured as or otherwise support a means for identifying a set of timing delays associated with the sidelink communications, where the first configuration includes a timing delay configuration that is based on the set of timing delays. In some examples, the set of timing delays include a HARQ timing delay, a CSI timing delay, or a combination thereof.

Additionally, or alternatively, the communications manager 620 may support wireless communication at a DU of a base station in accordance with examples as disclosed herein. The DU communication manager 630 may be configured as or otherwise support a means for receiving, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station. In some examples, the DU communication manager 630 may be configured as or otherwise support a means for performing the sidelink communications with the first set of UE according to the first configuration.

In some examples, the UL symbol type manager 635 may be configured as or otherwise support a means for identifying an uplink symbol type for each symbol in a set of uplink symbols available for the sidelink communications, where the first configuration includes an uplink symbol configuration that is based on the uplink symbol type of each symbol in the set of uplink symbols. In some examples, the uplink symbol configuration identifies an allowed uplink symbols of the set of uplink symbols for use in the sidelink communications.

In some examples, the sidelink resource manager 640 may be configured as or otherwise support a means for identifying a sidelink resource pool of available resources for use in the sidelink communications, where the first configuration includes a sidelink resource pool configuration that is based on the sidelink resource pool. In some examples, the sidelink resource pool configuration identifies a set of uplink symbols available for the sidelink communications, each symbol in the set of uplink symbols associated with an uplink symbol type. In some examples, the uplink symbol type of the set of uplink symbols available for sidelink communications includes a subset of uplink symbols including a hard uplink symbol type that is available for sidelink communications, a soft uplink symbol type that may be available for sidelink communications, or a unavailable uplink symbol type that is not available for sidelink communications.

In some examples, the first set of UE are not configured with the uplink symbol type of each symbol in the set of uplink symbols. In some examples, the first set of UE are configured with the uplink symbol type of each symbol in the set of uplink symbols.

In some examples, the timing delay manager 645 may be configured as or otherwise support a means for identifying a set of timing delays associated with the sidelink communications, where the first configuration includes a timing delay configuration that is based on the set of timing delays. In some examples, the set of timing delays include a HARQ timing delay, a CSI timing delay, or a combination thereof.

Figure 7:
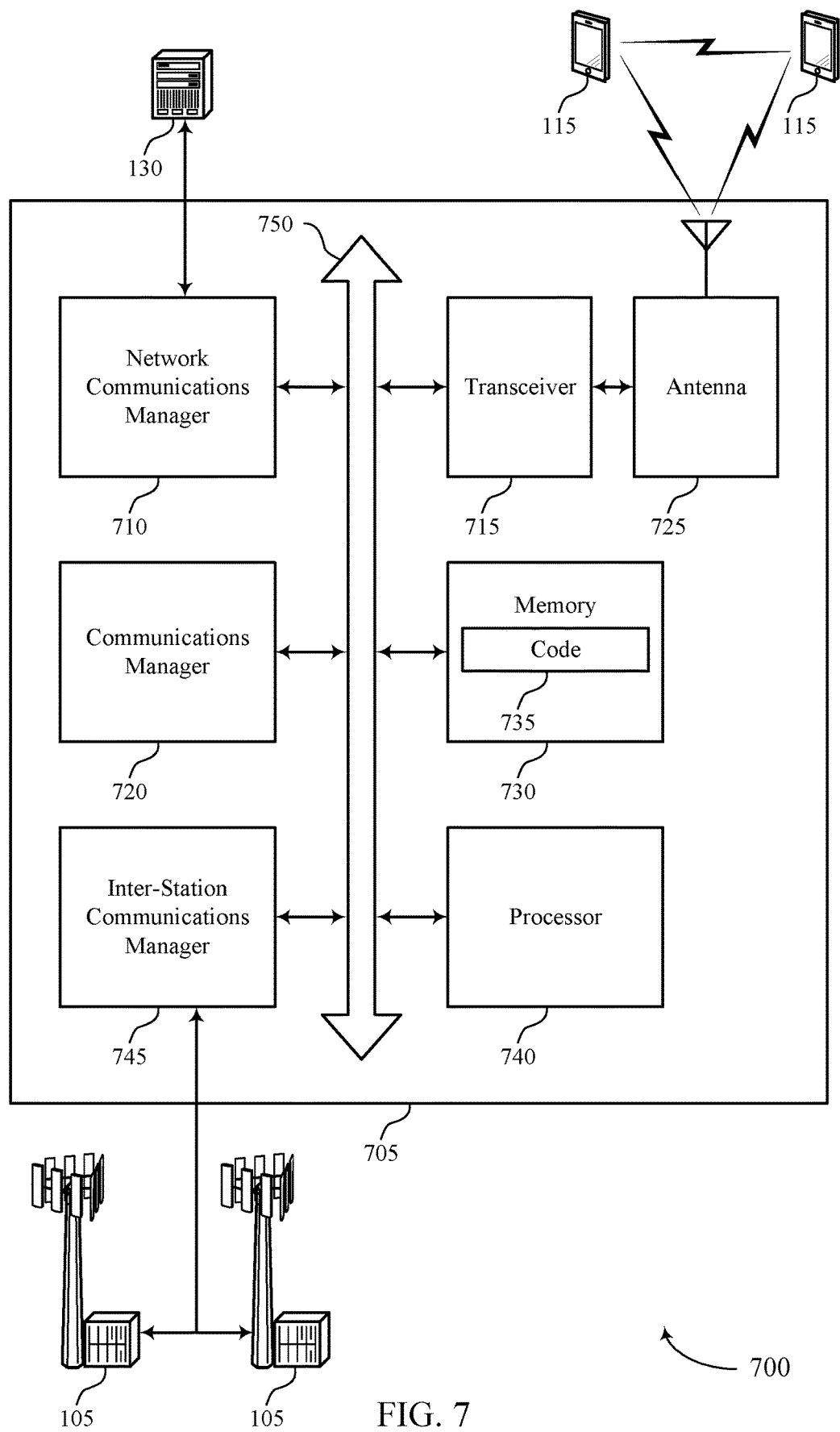
FIG. 7 shows a diagram of a system including a device that supports optimizations for sidelink UE for IAB network in accordance with aspects of the present disclosure.

FIG. 7 shows a diagram of a system 700 including a device 705 that supports optimizations for sidelink UE for IAB network in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting optimizations for sidelink UE for IAB network). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at a CU of a base station in accordance with examples as disclosed herein. For example, the communications manager 720 may be configured as or otherwise support a means for identifying a first set of UE to communicate via sidelink communications with a DU associated with the CU. The communications manager 720 may be configured as or otherwise support a means for determining, based on the DU being an IAB provider to the first set of UE, a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The communications manager 720 may be configured as or otherwise support a means for providing an indication of the first configuration to the DU.

Additionally, or alternatively, the communications manager 720 may support wireless communication at a DU of a base station in accordance with examples as disclosed herein. For example, the communications manager 720 may be configured as or otherwise support a means for receiving, based on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station. The communications manager 720 may be configured as or otherwise support a means for performing the sidelink communications with the first set of UE according to the first configuration.

By including or configuring the communications manager 720 in accordance with examples as described herein, the device 705 may support techniques for a CU function of a base station to more intelligently configure a DU function acting as an IAB node and performing sidelink communications with UE.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of optimizations for sidelink UE for IAB network as described herein, or the processor 740 and the memory 730 may be otherwise configured to perform or support such operations.

Figure 8:
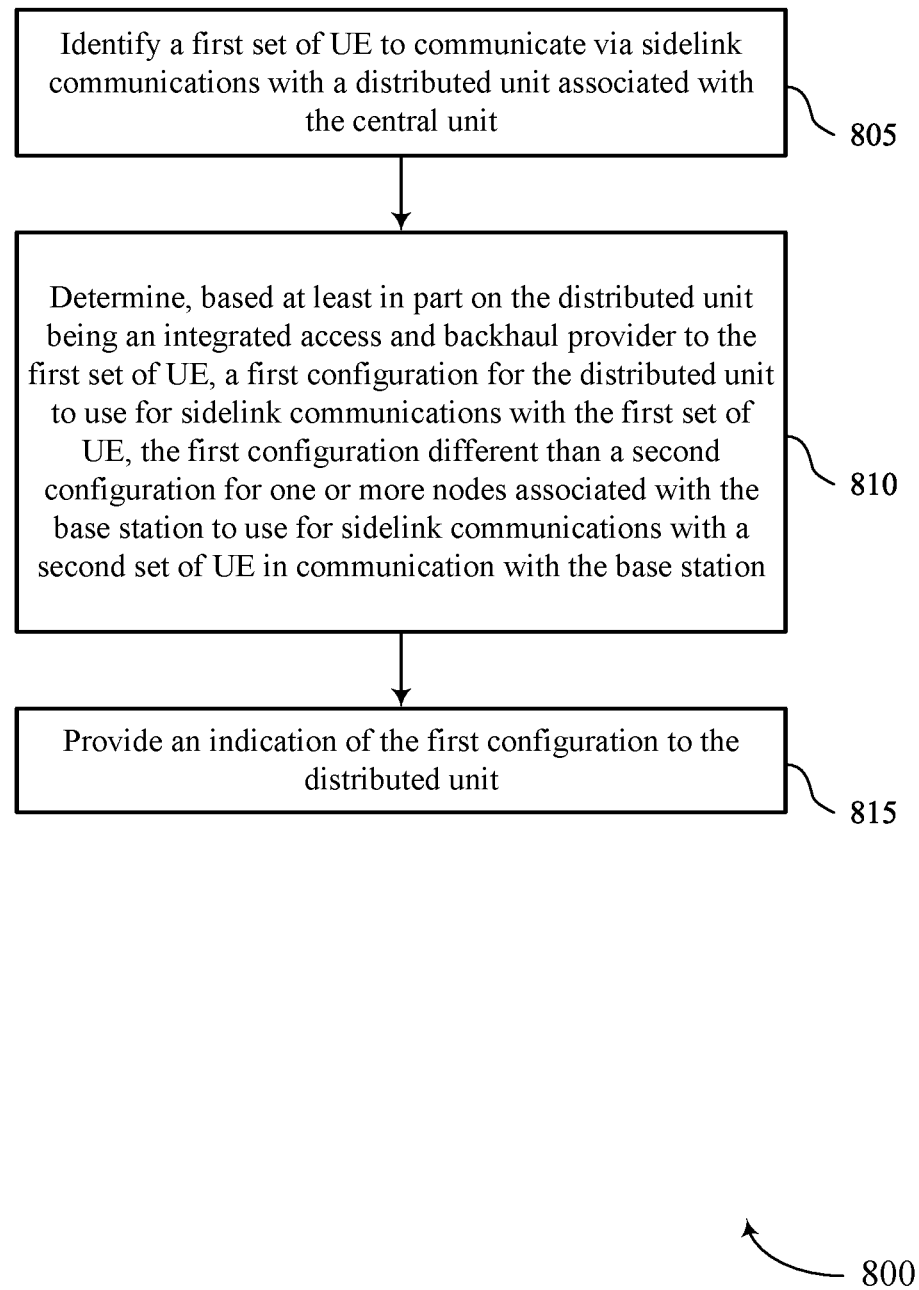
FIGS. 8 through 12 show flowcharts illustrating methods that support optimizations for sidelink UE for IAB network in accordance with aspects of the present disclosure.

FIG. 8 shows a flowchart illustrating a method 800 that supports optimizations for sidelink UE for IAB network in accordance with aspects of the present disclosure. The operations of the method 800 may be implemented by a base station or its components as described herein. For example, the operations of the method 800 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 805, the method may include identifying a first set of UE to communicate via sidelink communications with a DU associated with the CU. The operations of 805 may be performed in accordance with examples as disclosed herein. In some examples, aspects of the operations of 805 may be performed by a CU communication manager 625 as described with reference to FIG. 6.

At 810, the method may include determining, based on the DU being an IAB provider to the first set of UE, a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The operations of 810 may be performed in accordance with examples as disclosed herein. In some examples, aspects of the operations of 810 may be performed by a CU communication manager 625 as described with reference to FIG. 6.

At 815, the method may include providing an indication of the first configuration to the DU. The operations of 815 may be performed in accordance with examples as disclosed herein. In some examples, aspects of the operations of 815 may be performed by a CU communication manager 625 as described with reference to FIG. 6.

Figure 9:
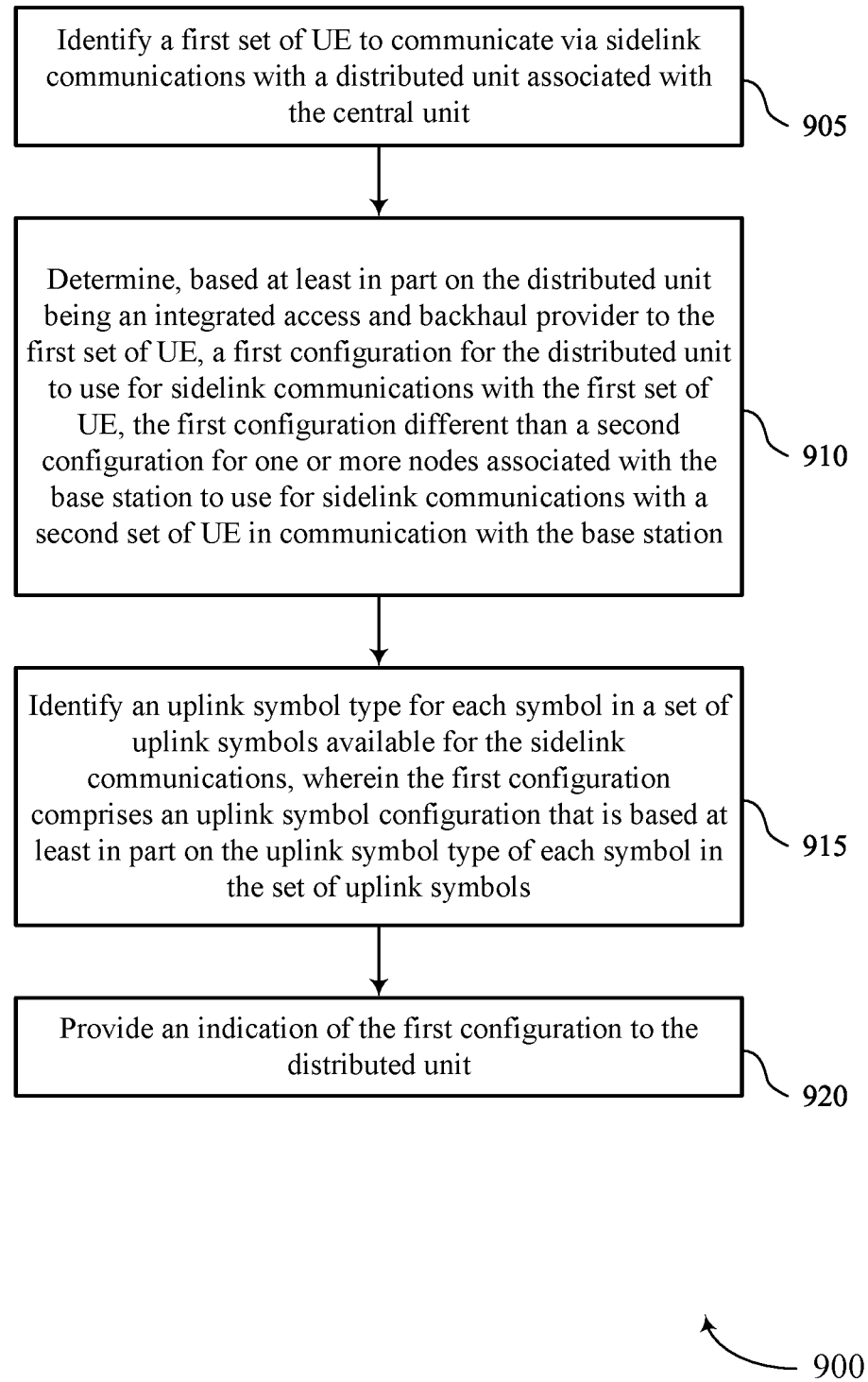

FIG. 9 shows a flowchart illustrating a method 900 that supports optimizations for sidelink UE for IAB network in accordance with aspects of the present disclosure. The operations of the method 900 may be implemented by a base station or its components as described herein. For example, the operations of the method 900 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 905, the method may include identifying a first set of UE to communicate via sidelink communications with a DU associated with the CU. The operations of 905 may be performed in accordance with examples as disclosed herein. In some examples, aspects of the operations of 905 may be performed by a CU communication manager 625 as described with reference to FIG. 6.

At 910, the method may include determining, based on the DU being an IAB provider to the first set of UE, a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The operations of 910 may be performed in accordance with examples as disclosed herein. In some examples, aspects of the operations of 910 may be performed by a CU communication manager 625 as described with reference to FIG. 6.

At 915, the method may include identifying an uplink symbol type for each symbol in a set of uplink symbols available for the sidelink communications, where the first configuration includes an uplink symbol configuration that is based on the uplink symbol type of each symbol in the set of uplink symbols. The operations of 915 may be performed in accordance with examples as disclosed herein. In some examples, aspects of the operations of 915 may be performed by a UL symbol type manager 635 as described with reference to FIG. 6.

At 920, the method may include providing an indication of the first configuration to the DU. The operations of 920 may be performed in accordance with examples as disclosed herein. In some examples, aspects of the operations of 920 may be performed by a CU communication manager 625 as described with reference to FIG. 6.

Figure 10:
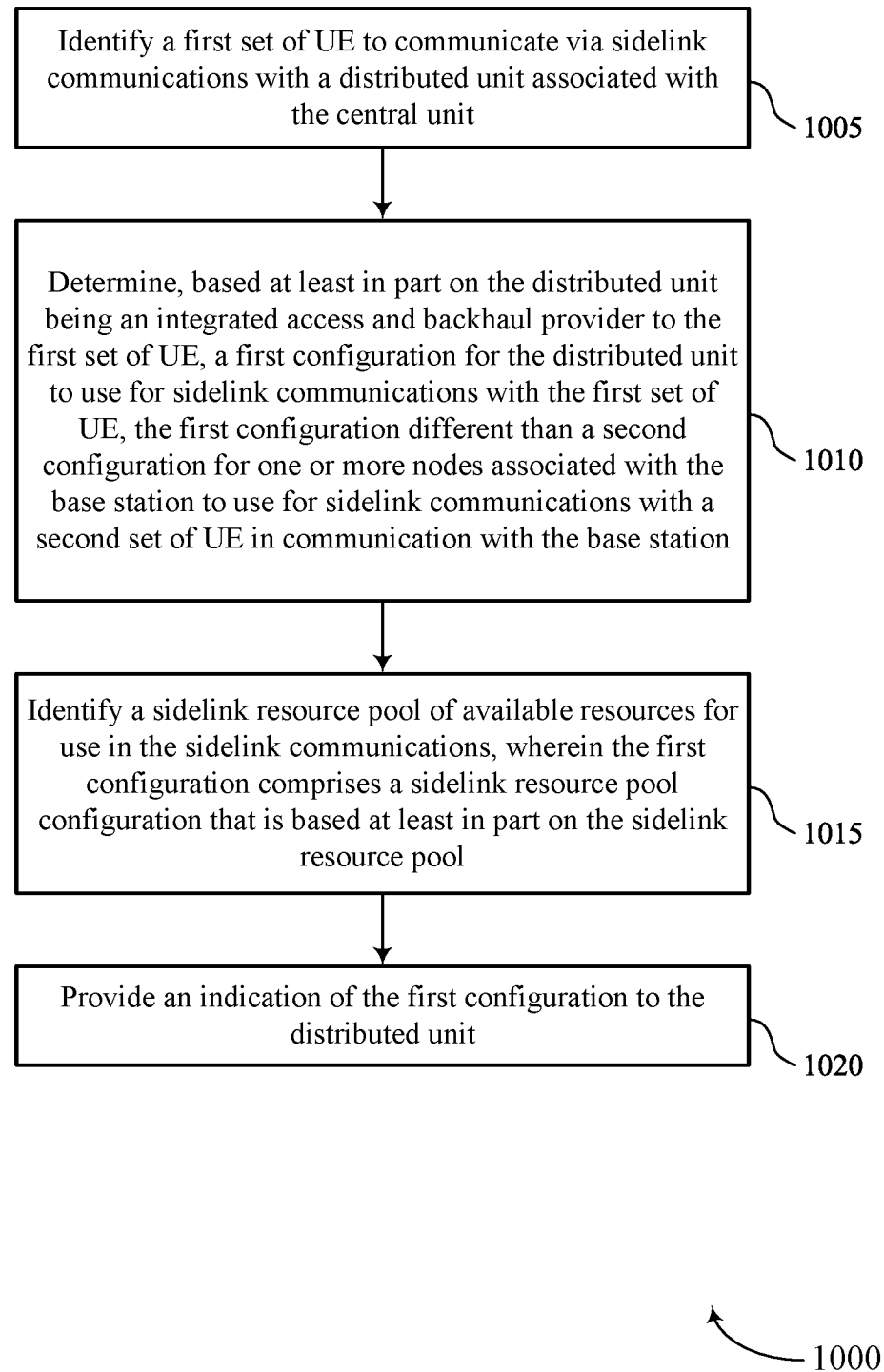

FIG. 10 shows a flowchart illustrating a method 1000 that supports optimizations for sidelink UE for IAB network in accordance with aspects of the present disclosure. The operations of the method 1000 may be implemented by a base station or its components as described herein. For example, the operations of the method 1000 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1005, the method may include identifying a first set of UE to communicate via sidelink communications with a DU associated with the CU. The operations of 1005 may be performed in accordance with examples as disclosed herein. In some examples, aspects of the operations of 1005 may be performed by a CU communication manager 625 as described with reference to FIG. 6.

At 1010, the method may include determining, based on the DU being an IAB provider to the first set of UE, a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The operations of 1010 may be performed in accordance with examples as disclosed herein. In some examples, aspects of the operations of 1010 may be performed by a CU communication manager 625 as described with reference to FIG. 6.

At 1015, the method may include identifying a sidelink resource pool of available resources for use in the sidelink communications, where the first configuration includes a sidelink resource pool configuration that is based on the sidelink resource pool. The operations of 1015 may be performed in accordance with examples as disclosed herein. In some examples, aspects of the operations of 1015 may be performed by a sidelink resource manager 640 as described with reference to FIG. 6.

At 1020, the method may include providing an indication of the first configuration to the DU. The operations of 1020 may be performed in accordance with examples as disclosed herein. In some examples, aspects of the operations of 1020 may be performed by a CU communication manager 625 as described with reference to FIG. 6.

Figure 11:
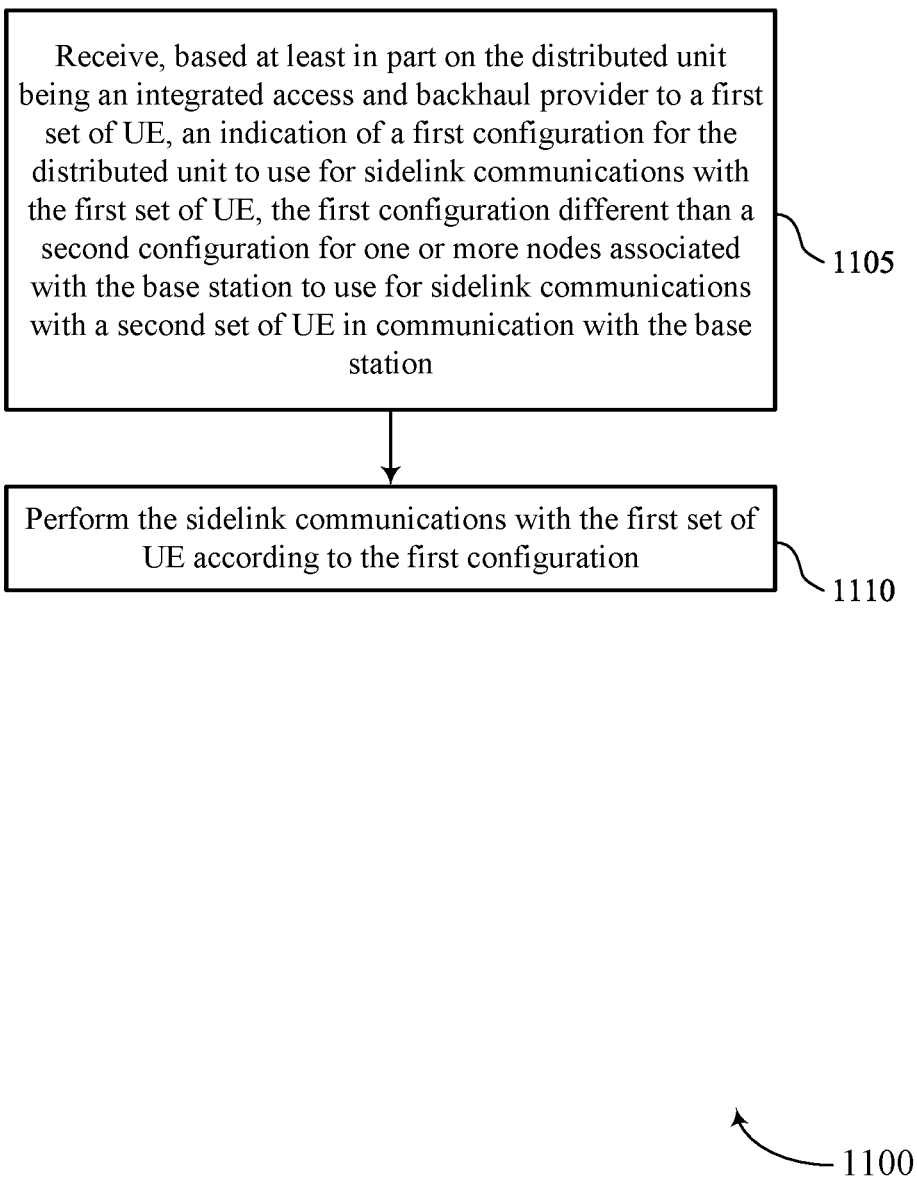

FIG. 11 shows a flowchart illustrating a method 1100 that supports optimizations for sidelink UE for IAB network in accordance with aspects of the present disclosure. The operations of the method 1100 may be implemented by a base station or its components as described herein. For example, the operations of the method 1100 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1105, the method may include receiving, based on the DU being an IAB provider to a first set of UE, an indication of a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The operations of 1105 may be performed in accordance with examples as disclosed herein. In some examples, aspects of the operations of 1105 may be performed by a DU communication manager 630 as described with reference to FIG. 6.

At 1110, the method may include performing the sidelink communications with the first set of UE according to the first configuration. The operations of 1110 may be performed in accordance with examples as disclosed herein. In some examples, aspects of the operations of 1110 may be performed by a DU communication manager 630 as described with reference to FIG. 6.

Figure 12:
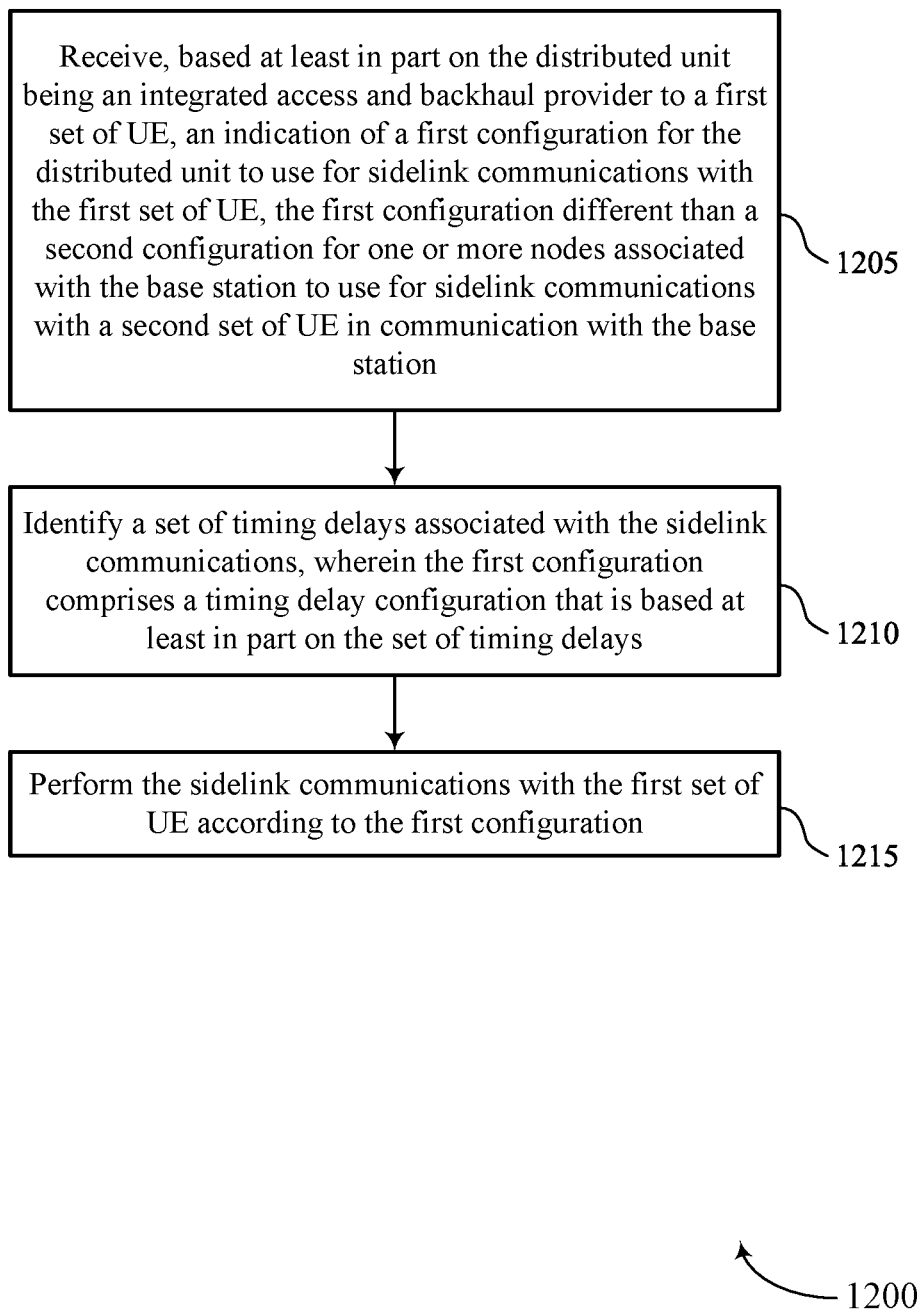

FIG. 12 shows a flowchart illustrating a method 1200 that supports optimizations for sidelink UE for IAB network in accordance with aspects of the present disclosure. The operations of the method 1200 may be implemented by a base station or its components as described herein. For example, the operations of the method 1200 may be performed by a base station 105 as described with reference to FIGS. 1 through 7. In some examples, a base station may execute a set of instructions to control the functional elements of the base station to perform the described functions. Additionally, or alternatively, the base station may perform aspects of the described functions using special-purpose hardware.

At 1205, the method may include receiving, based on the DU being an IAB provider to a first set of UE, an indication of a first configuration for the DU to use for sidelink communications with the first set of UE (e.g., between the DU and the UEs in the first set of UEs and/or between the UEs in the first set of UEs based on coordination/configuration of the sidelink communications by the DU), the first configuration different than a second configuration for one or more nodes associated with the base station to use for sidelink communications with a second set of UE in communication with the base station. The operations of 1205 may be performed in accordance with examples as disclosed herein. In some examples, aspects of the operations of 1205 may be performed by a DU communication manager 630 as described with reference to FIG. 6.

At 1210, the method may include identifying a set of timing delays associated with the sidelink communications, where the first configuration includes a timing delay configuration that is based on the set of timing delays. The operations of 1210 may be performed in accordance with examples as disclosed herein. In some examples, aspects of the operations of 1210 may be performed by a timing delay manager 645 as described with reference to FIG. 6.

At 1215, the method may include performing the sidelink communications with the first set of UE according to the first configuration. The operations of 1215 may be performed in accordance with examples as disclosed herein. In some examples, aspects of the operations of 1215 may be performed by a DU communication manager 630 as described with reference to FIG. 6.

The following provides an overview of aspects of the present disclosure:

Aspect 1: A method for wireless communication at a CU of a base station, comprising: identifying a first set of UE to communicate via sidelink communications with a DU associated with the CU; determining, based at least in part on the DU being an IAB provider to the first set of UE, a first configuration for the DU to use for sidelink communications with the first set of UE, the first configuration different than a second configuration for one or more nodes associated with the base station to use for sidelink communications with a second set of UE in communication with the base station; and providing an indication of the first configuration to the DU.

Aspect 2: The method of aspect 1, further comprising: identifying an uplink symbol type for each symbol in a set of uplink symbols available for the sidelink communications, wherein the first configuration comprises an uplink symbol configuration that is based at least in part on the uplink symbol type of each symbol in the set of uplink symbols.

Aspect 3: The method of aspect 2, wherein the uplink symbol configuration identifies an allowed uplink symbols of the set of uplink symbols for use in the sidelink communications.

Aspect 4: The method of any of aspects 1 through 3, further comprising: identifying a sidelink resource pool of available resources for use in the sidelink communications, wherein the first configuration comprises a sidelink resource pool configuration that is based at least in part on the sidelink resource pool.

Aspect 5: The method of aspect 4, wherein the sidelink resource pool configuration identifies a set of uplink symbols available for the sidelink communications, each symbol in the set of uplink symbols associated with an uplink symbol type.

Aspect 6: The method of aspect 5, wherein the uplink symbol type of the set of uplink symbols available for sidelink communications comprises a subset of uplink symbols including a hard uplink symbol type that is available for sidelink communications, a soft uplink symbol type that may be available for sidelink communications, or a unavailable uplink symbol type that is not available for sidelink communications.

Aspect 7: The method of any of aspects 5 through 6, wherein the first set of UE are not configured with the uplink symbol type of each symbol in the set of uplink symbols.

Aspect 8: The method of any of aspects 5 through 7, wherein the first set of UE are configured with the uplink symbol type of each symbol in the set of uplink symbols.

Aspect 9: The method of any of aspects 1 through 8, further comprising: identifying a set of timing delays associated with the sidelink communications, wherein the first configuration comprises a timing delay configuration that is based at least in part on the set of timing delays.

Aspect 10: The method of aspect 9, wherein the set of timing delays comprise a hybrid automatic repeat/request timing delay, a channel state information timing delay, or a combination thereof.

Aspect 11: A method for wireless communication at a DU of a base station, comprising: receiving, based at least in part on the DU being an IAB provider to a first set of UE, an indication of a first configuration for the DU to use for sidelink communications with the first set of UE, the first configuration different than a second configuration for one or more nodes associated with the base station to use for sidelink communications with a second set of UE in communication with the base station; and performing the sidelink communications with the first set of UE according to the first configuration.

Aspect 12: The method of aspect 11, further comprising: identifying an uplink symbol type for each symbol in a set of uplink symbols available for the sidelink communications, wherein the first configuration comprises an uplink symbol configuration that is based at least in part on the uplink symbol type of each symbol in the set of uplink symbols.

Aspect 13: The method of aspect 12, wherein the uplink symbol configuration identifies an allowed uplink symbols of the set of uplink symbols for use in the sidelink communications.

Aspect 14: The method of any of aspects 11 through 13, further comprising: identifying a sidelink resource pool of available resources for use in the sidelink communications, wherein the first configuration comprises a sidelink resource pool configuration that is based at least in part on the sidelink resource pool.

Aspect 15: The method of aspect 14, wherein the sidelink resource pool configuration identifies a set of uplink symbols available for the sidelink communications, each symbol in the set of uplink symbols associated with an uplink symbol type.

Aspect 16: The method of aspect 15, wherein the uplink symbol type of the set of uplink symbols available for sidelink communications comprises a subset of uplink symbols including a hard uplink symbol type that is available for sidelink communications, a soft uplink symbol type that may be available for sidelink communications, or a unavailable uplink symbol type that is not available for sidelink communications.

Aspect 17: The method of any of aspects 15 through 16, wherein the first set of UE are not configured with the uplink symbol type of each symbol in the set of uplink symbols.

Aspect 18: The method of any of aspects 15 through 17, wherein the first set of UE are configured with the uplink symbol type of each symbol in the set of uplink symbols.

Aspect 19: The method of any of aspects 11 through 18, further comprising: identifying a set of timing delays associated with the sidelink communications, wherein the first configuration comprises a timing delay configuration that is based at least in part on the set of timing delays.

Aspect 20: The method of aspect 19, wherein the set of timing delays comprise a hybrid automatic repeat/request timing delay, a channel state information timing delay, or a combination thereof.

Aspect 21: An apparatus for wireless communication at a CU of a base station, comprising a processor; memory coupled with the processor; and instructions stored in the memory and executable by the processor to cause the apparatus to perform a method of any of aspects 1 through 10.

Aspect 22: An apparatus for wireless communication at a CU of a base station, comprising at least one means for performing a method of any of aspects 1 through 10.

Aspect 23: A non-transitory computer-readable medium storing code for wireless communication at a CU of a base station, the code comprising instructions executable by a processor to perform a method of any of aspects 1 through 10.

Aspect 24: An apparatus for wireless communication at a DU of a base station, comprising a processor; memory coupled with the processor; and instructions stored in the memory and executable by the processor to cause the apparatus to perform a method of any of aspects 11 through 20.

Aspect 25: An apparatus for wireless communication at a DU of a base station, comprising at least one means for performing a method of any of aspects 11 through 20.

Aspect 26: A non-transitory computer-readable medium storing code for wireless communication at a DU of a base station, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a central unit of a network device, comprising:
   identifying a first set of user equipment (UE) associated with a distributed unit associated with the central unit;
   determining, based at least in part on the distributed unit being a wireless integrated access and backhaul provider to the first set of UE, a first sidelink configuration to be used by the first set of UE for sidelink communications, the first sidelink configuration different than a second sidelink configuration for a second set of other UE for sidelink communications, wherein the second set of other UE are associated with one or more nodes associated with the network device, and wherein the one or more nodes are different than the distributed unit; and
   providing an indication of the first sidelink configuration to the distributed unit.

2. The method of claim 1, further comprising:
   identifying an uplink symbol type for each symbol in a set of uplink symbols available for the sidelink communications, wherein the first sidelink configuration comprises an uplink symbol configuration that is based at least in part on the uplink symbol type of each symbol in the set of uplink symbols.

3. The method of claim 2, wherein the uplink symbol configuration identifies an allowed uplink symbols of the set of uplink symbols for use in the sidelink communications.

4. The method of claim 1, further comprising:
   identifying a sidelink resource pool of available resources for use in the sidelink communications, wherein the first sidelink configuration comprises a sidelink resource pool configuration that is based at least in part on the sidelink resource pool.

5. The method of claim 4, wherein the sidelink resource pool configuration identifies a set of uplink symbols available for the sidelink communications, each symbol in the set of uplink symbols associated with an uplink symbol type.

6. The method of claim 5, wherein the uplink symbol type of the set of uplink symbols available for sidelink communications comprises a subset of uplink symbols including a hard uplink symbol type that is available for sidelink communications, a soft uplink symbol type that may be available for sidelink communications, or an unavailable uplink symbol type that is not available for sidelink communications.

7. The method of claim 5, wherein the first set of UE are not configured with the uplink symbol type of each symbol in the set of uplink symbols.

8. The method of claim 5, wherein the first set of UE are configured with the uplink symbol type of each symbol in the set of uplink symbols.

9. The method of claim 1, further comprising:
identifying a set of timing delays associated with the sidelink communications, wherein the first sidelink configuration comprises a timing delay configuration that is based at least in part on the set of timing delays.

10. The method of claim 9, wherein the set of timing delays comprise a hybrid automatic repeat/request timing delay, a channel state information timing delay, or a combination thereof.

11. A method for wireless communication at a distributed unit of a network device, comprising:
receiving, based at least in part on the distributed unit being a wireless integrated access and backhaul provider to a first set of user equipment (UE), an indication of a first sidelink configuration for the first set of UE, the first sidelink configuration different than a second sidelink configuration for a second set of other UE in communication with the network device via one or more nodes associated with the network device, wherein the one or more nodes are different than the distributed unit; and
configuring the first set of UE according to the first sidelink configuration.

12. The method of claim 11, further comprising:
identifying an uplink symbol type for each symbol in a set of uplink symbols available for sidelink communications, wherein the first sidelink configuration comprises an uplink symbol configuration that is based at least in part on the uplink symbol type of each symbol in the set of uplink symbols.

13. The method of claim 12, wherein the uplink symbol configuration identifies an allowed uplink symbols of the set of uplink symbols for use in the sidelink communications.

14. The method of claim 11, further comprising:
identifying a sidelink resource pool of available resources for use in sidelink communications, wherein the first sidelink configuration comprises a sidelink resource pool configuration that is based at least in part on the sidelink resource pool.

15. The method of claim 14, wherein the sidelink resource pool configuration identifies a set of uplink symbols available for the sidelink communications, each symbol in the set of uplink symbols associated with an uplink symbol type.

16. The method of claim 15, wherein the uplink symbol type of the set of uplink symbols available for sidelink communications comprises a subset of uplink symbols including a hard uplink symbol type that is available for sidelink communications, a soft uplink symbol type that may be available for sidelink communications, or an unavailable uplink symbol type that is not available for sidelink communications.

17. The method of claim 15, wherein the first set of UE are not configured with the uplink symbol type of each symbol in the set of uplink symbols.

18. The method of claim 15, wherein the first set of UE are configured with the uplink symbol type of each symbol in the set of uplink symbols.

19. The method of claim 11, further comprising:
identifying a set of timing delays associated with sidelink communications, wherein the first sidelink configuration comprises a timing delay configuration that is based at least in part on the set of timing delays.

20. The method of claim 19, wherein the set of timing delays comprise a hybrid automatic repeat/request timing delay, a channel state information timing delay, or a combination thereof.

21. An apparatus for wireless communication at a central unit of a network device, comprising:
one or more processors;
one or more memories coupled with the one or more processors; and
instructions stored in the one or more memories and executable by the one or more processors to cause the apparatus to:
identify a first set of user equipment (UE) associated with a distributed unit associated with the central unit;
determine, based at least in part on the distributed unit being a wireless integrated access and backhaul provider to the first set of UE, a first sidelink configuration to be used by the first set of UE for sidelink communications, the first sidelink configuration different than a second sidelink configuration for a second set of other UE for sidelink communications, wherein the second set of other UE are associated with one or more nodes associated with the network device, and wherein the one or more nodes are different than the distributed unit; and
provide an indication of the first sidelink configuration to the distributed unit.

22. The apparatus of claim 21, wherein the instructions are further executable by the one or more processors to cause the apparatus to:
identify an uplink symbol type for each symbol in a set of uplink symbols available for the sidelink communications, wherein the first sidelink configuration comprises an uplink symbol configuration that is based at least in part on the uplink symbol type of each symbol in the set of uplink symbols.

23. The apparatus of claim 22, wherein the uplink symbol configuration identifies an allowed uplink symbols of the set of uplink symbols for use in the sidelink communications.

24. The apparatus of claim 21, wherein the instructions are further executable by the one or more processors to cause the apparatus to:
identify a sidelink resource pool of available resources for use in the sidelink communications, wherein the first sidelink configuration comprises a sidelink resource pool configuration that is based at least in part on the sidelink resource pool.

25. The apparatus of claim 24, wherein the sidelink resource pool configuration identifies a set of uplink symbols available for the sidelink communications, each symbol in the set of uplink symbols associated with an uplink symbol type.

26. The apparatus of claim 25, wherein the uplink symbol type of the set of uplink symbols available for sidelink communications comprises a subset of uplink symbols including a hard uplink symbol type that is available for sidelink communications, a soft uplink symbol type that may be available for sidelink communications, or an unavailable uplink symbol type that is not available for sidelink communications.

27. The apparatus of claim 25, wherein the first set of UE are not configured with the uplink symbol type of each symbol in the set of uplink symbols.

28. The apparatus of claim 25, wherein the first set of UE are configured with the uplink symbol type of each symbol in the set of uplink symbols.

29. The apparatus of claim 21, wherein the instructions are further executable by the one or more processors to cause the apparatus to:
- identify a set of timing delays associated with the sidelink communications, wherein the first sidelink configuration comprises a timing delay configuration that is based at least in part on the set of timing delays.

30. An apparatus for wireless communication at a distributed unit of a network device, comprising:
- one or more processors;
- one or more memories coupled with the one or more processors; and
- instructions stored in the one or more memories and executable by the one or more processors to cause the apparatus to:
  - receive, based at least in part on the distributed unit being a wireless integrated access and backhaul provider to a first set of user equipment (UE), an indication of a first sidelink configuration for the first set of UE, the first sidelink configuration different than a second sidelink configuration for a second set of other UE in communication with the network device via one or more nodes associated with the network device, wherein the one or more nodes are different than the distributed unit; and
  - configure the first set of UE according to the first sidelink configuration.

\* \* \* \* \*